United States Patent
Powell et al.

[11] 3,901,562
[45] Aug. 26, 1975

[54] BRAKE PIPE REDUCTION INDICATING APPARATUS

[75] Inventors: Peter H. Powell, Chippenham, England; Archibald J. Harvey Peterson, Pointe-Claire, Canada

[73] Assignee: WABCO Ltd., Hamilton, Canada

[22] Filed: Mar. 15, 1974

[21] Appl. No.: 451,445

[52] U.S. Cl. .......................... 303/86; 73/39; 303/1
[51] Int. Cl.² ..................... B60T 17/22; G01M 3/02
[58] Field of Search................ 303/86, 86 X, 80–82, 303/1, 2, 3, 33, 23; 73/39, 37; 116/55; 246/180–191; 188/151 A, 1 A

[56] References Cited
UNITED STATES PATENTS

| | | | |
|---|---|---|---|
| 2,128,084 | 8/1938 | Farmer et al. | 303/23 A |
| 2,674,121 | 4/1954 | Gorman | 73/39 |
| 2,937,907 | 5/1960 | Harris et al. | 303/81 X |
| 2,992,861 | 7/1961 | Hursen | 303/33 |
| 3,531,981 | 10/1970 | Pommer | 303/1 X |

*Primary Examiner*—Trygve M. Blix
*Assistant Examiner*—Douglas C. Butler
*Attorney, Agent, or Firm*—R. W. McIntire, Jr.

[57] ABSTRACT

Brake pipe reduction indicating apparatus for railway braking equipment in which a differential pressure gauge is employed for comparing brake pipe pressure with the level of equalizing reservoir pressure prevailing at the onset of brake pipe pressure reduction initiated by the engineer's brake valve, thereby providing the engineer with a positive visual indication of the actual brake pipe reduction taking place. The invention eliminates the necessity of the engineer to rely solely on his judgement in effecting an equalizing reservoir pressure reduction sufficient for compensating for a brake pipe pressure gradient without the benefit of an indicator which, at least, indicates the upper pressure limit of the gradient, that is, the specific pressure to which the equalizing reservoir pressure must be reduced to initiate brake pipe reduction.

5 Claims, 1 Drawing Figure

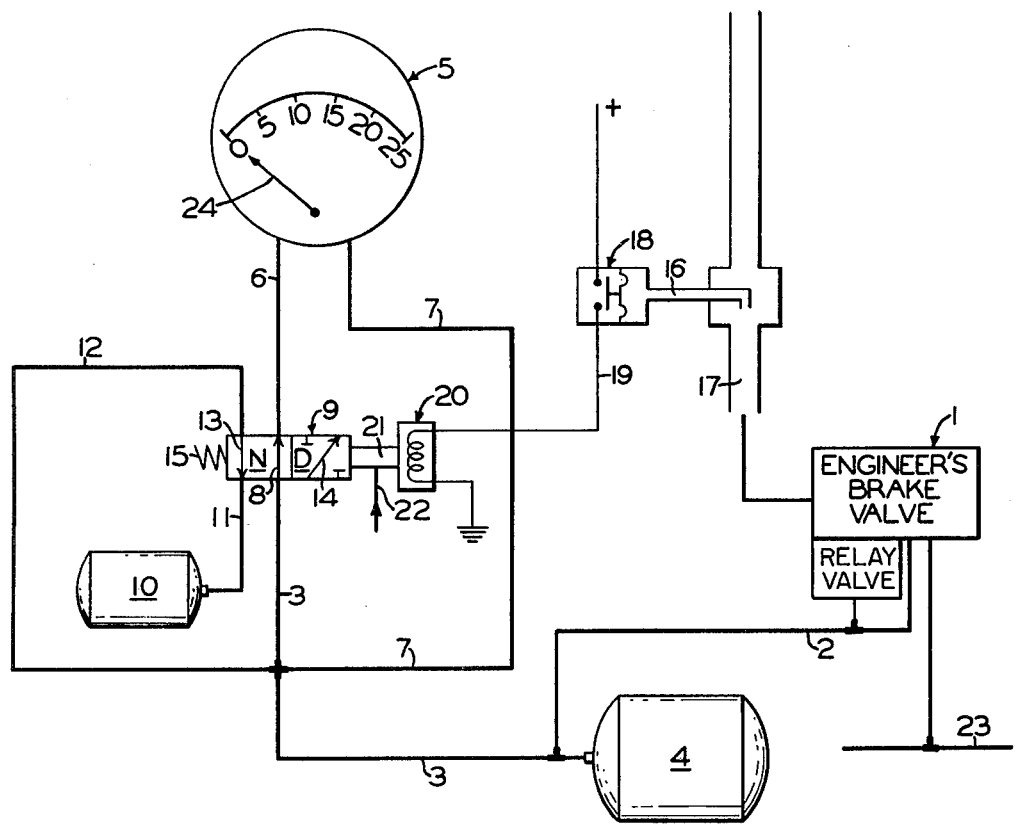

BRAKE PIPE REDUCTION INDICATING APPARATUS

BACKGROUND OF THE INVENTION

As is well known to those skilled in the art of the so-called fluid pressure operable automatic railway brake equipment, a service brake application is initiated by operating the handle of the engineer's brake valve to a service application position which results in cutting off connection from the feed pipe to the brake pipe and causing pressure in the equalizing reservoir to be reduced accordingly. Normally, reduction of equalizing reservoir pressure actuates a relay valve for opening the brake pipe to atmosphere for effecting a reduction of brake pipe pressure equivalent to the reduction made in the equalizing reservoir. In well known manner, a reduction of brake pipe pressure causes the brake equipment to effect a brake application of a degree corresponding to the degree of brake pipe pressure reduction.

The automatic brake equipment herein considered is operationally characterized in that immediately upon movement of the brake valve handle toward the service application zone and prior to actuation of the relay valve, the equipment goes through a "quick service" phase of operation in which a predetermined degree of brake pipe pressure reduction occurs simultaneously at each of the cars to provide and insure a predetermined initial degree of brake application, notwithstanding that the engineer may further manipulate the handle for further adjusting the degree of the application. Sequentially to the initial quick service phase of operation, the relay valve responds to reduction of equalizing reservoir pressure for connecting the brake pipe to atmosphere, as above described.

The relay valve, however, does not respond to equalizing reservoir pressure reduction, that is, will not operate to effect any brake pipe pressure reduction unless or until pressure in the equalizing reservoir is reduced to the pressure prevailing in the brake pipe, whereupon said relay valve operates to connect the brake pipe to atmosphere. Thus, notwithstanding that the engineer may observe on the equalizing reservoir pressure gauge that pressure in the reservoir is dropping, it does not necessarily indicate that pressure in the brake pipe is also dropping and that a brake application is in effect.

Since the atmospheric vent via which brake pipe reduction occurs (subsequently to the quick service phase of operation), is located at the engineer's brake valve, the blowing or hissing sound made by the escaping air apprises the engineer at the instant brake pipe pressure reduction commences, the amount or rate of such reduction being important to him in that, from experience, that is, knowing the length of the train and the operational nature of the brake equipment, he is able to judge the magnitude and nature of the application being effected by the length of the time period during which the sound of escaping air occurs. In some of the present equipment, however, the escaping air from the brake pipe is piped from the vent port to a location outside the locomotive cab so that the sound made thereby is not available to the engineer.

Or the engineer may observe the brake pipe pressure gauge simultaneously with the equalizing reservoir gauge so that he may note at which point both pressures start to drop simultaneously, which is the point at which brake pipe pressure reduction commences. He must mentally note the specific pressure reading from the gauges and make the amount of reduction accordingly. Since the engineer may be preoccupied with other duties, he may inadvertently fail to note the pressure reading at which brake pipe pressure reduction commenced and, therefore, be unable to make a satisfactory appraisal of the brake pipe pressure gradient.

Subsequently to release of the brake application, recharging of the brake pipe occurs from the engineer's brake valve in the locomotive or at the heat end of the brake pipe, which consequently leaves the rear end recharging of the brake pipe lagging until recharging is completed. It is during this period of recharging that the engineer must be aware of any substantial pressure gradient existing between the head end and rear end of the brake pipe, if he is required to initiate a brake application, so that he may initiate a sufficient reduction to compensate for the greater than normal pressure gradient (such as that due to normal leakage).

As was previously noted, when an application is initiated, pressure supply to the brake pipe, or charging, is immediately cut off and the brake application is immediately effected throughout the train. If at the time the application is initiated, however, a greater than normal pressure gradient exists (subsequent to quick service operation and before there has been sufficient time for the brake pipe to fully recharge) the existing pressure in the brake pipe tends to redistribute with the higher pressure at the head end flowing toward the rear end. If the engineer has not effected a brake pipe reduction sufficient for dissipating the pressure flowing to the rear end, such pressure build-up in the rear end of the brake pipe may be effective for causing inadvertent release of the brakes in the rear of the train.

SUMMARY OF THE INVENTION

The object of the invention is to provide apparatus whereby a visual indication is provided for the engineer whereby he knows at any instant during the time that brake pipe pressure reduction is occurring precisely what the pressure differential is between the pressure at which brake pipe reduction commenced and at the instant the reading is made and he may determine, from experience and the reading made, if he has effected a sufficient reduction compensating for the existing pressure gradient. He may make adjustment accordingly, if necessary.

The invention comprises a differential pressure gauge normally subjected on the high pressure side, via a switch-over valve device in a normal position, to equalizing reservoir pressure. A reference reservoir normally charged to pressure equivalent to that in the equalizing reservoir, is also connected to the high pressure side of the differential pressure gauge via the switch-over valve device in parallel relation to the equalizing reservoir. The low pressure side of the differential pressure gauge is constantly connected and subject to prevailing pressure in the brake pipe when a brake application is initiated, in the manner above noted. A sensing device, connected to brake pipe exhaust at the brake valve, responds to such brake pipe exhaust at the instant fluid pressure reduction in the brake pipe commences to cause operation of an electrical switch which, in turn, causes the switchover valve to change from its normal position to a differential position in which the equalizing reservoir is isolated from both the differential gauge and the reference reservoir, only the latter remaining connected to said high pressure side of the gauge. Since, as was above noted, brake pipe reduction does not commence until equalizing reservoir pressure drops to that of the brake pipe, the indicator on the differential gauge remains at the zero position until brake pipe pressure reduction commences, at which point, as above noted, the switch-over valve is operated to its differential position, whereupon pressure on the high pressure side of the differential gauge remains fixed at that pressure prevailing in the reference reservoir which corresponds to the pressure in the brake pipe when reduction thereof commences. With the pressure on the high pressure side remaining constant, at what may be called a reference degree, continuing reduction in the brake pipe and, therefore, on the low pressure side of the differential gauge establishes a pressure differential readily readable by the engineer on the differential gauge. Knowing the length of his train and the operational nature of his brake equipment, the engineer, from his experience, is immediately able to determine from the differential indicated, which is from the point at which effective brake pipe pressure commenced, whether he has made the proper pressure reduction to provide the degree of braking desired.

The single FIGURE drawing is a schematic view of a brake pipe pressure indicating apparatus embodying the invention.

DESCRIPTION AND OPERATION

As shown in the drawing, the apparatus embodying the invention comprises an engineer's or operator's brake valve 1 (mounted in the locomotive cab) connected via pipes 2 and 3 to an equalizing reservoir 4.

A differential pressure gauge 5 has a pipe 6 connected to the high pressure side thereof and has one end of a pipe 7 connected to the low pressure side, the other end of said pipe 7 being connected to pipe 3. Pipe 6, or the high pressure side of pressure gauge 5, is normally connected to pipe 3, or the equalizing reservoir, via a passageway 8 in a switch-over valve device 9 interposed between pipes 3 and 6, when said switch-over valve device is an a normal position, in which it is shown and indicated N in the drawing and in which pipes 3 and 6 are in communication with each other.

A pressure reference volume or reservoir 10 is also connected to pipe 3 and, therefore, to the high pressure side of differential gauge 5 via pipes 11 and 12 between which the switch-over valve device 9 is interposed also, so that in the normal position of the switch-over valve device, said pipes 11 and 12 are in communication with each other via a passageway 13, and, therefore, said reference volume is connected to said differential gauge via pipe 11, passageway 13, pipe 12, pipe 3, passageway 8 in the switch-over valve device, and pipe 6. Switch-over valve device 9 is operable, in a manner to be hereinafter explained, to a differential position, marked D in the drawing, in which the ends of pipes 3 and 12 are closed at said switch-over valve device, so that equalizing reservoir 4 is cut off from both differential gauge 5 and reference volume 10, and pipe 11 is placed in communication with pipe 6 via a passageway 14 in the switch-over valve device so that said reference volume is placed directly in communication with the high pressure side of said differential gauge. Thus, after operation of the switch-over valve device 9 to its differential position, the pressure registering on the high pressure side of gauge 5 is the pressure prevailing in reference volume 10 at the time of said switch over, such pressure thereafter remaining unchanged or constant, or at what may be called a reference pressure, until such time that said switch-over valve device is restored to its normal position.

Switch-over valve device 9 is biased toward its normal position by a spring 15.

A fluid pressure sensing device 16 is tapped off an exhaust pipe 17 leading from the brake pipe exhaust port in the engineer's brake valve device 1, and is operably connected to a low-pressure electrical switch device 18. In response to flow of brake pipe exhaust through pipe 17, sensing device 16 causes switch 18, which is normally in an open position, to be subjected to such fluid pressure and be operated to a closed position in which an electrical circuit 19 is closed for energizing a solenoid 20. Energization of solenoid 20 actuates a pilot valve 21 to an open position in which switch-over valve device 9 is subjected to operating pressure from an air supply 22 and is thereby operated to its differential position, above defined.

As was above noted, when the engineer initiates a brake application by effecting a reduction of fluid pressure in equalizing reservoir 4 by operating the brake valve 1 to a service position, a relay valve forming a part of said brake valve and designated symbolically in the drawing, operates in response to such equalizing reservoir pressure reduction to open brake pipe 23, via said brake valve, to exhaust pipe 17, but only when the pressure in said equalizing reservoir has been reduced to a fraction of a psi. below that pressure prevailing in the head end of the brake pipe when the application is initiated. Thus, if brake pipe 23 is fully charged to a normal charge of 70 psi., for example, (which would, therefore, also be the normal full charge for equalizing reservoir 4) when the engineer initiates a reduction of equalizing reservoir pressure, such as 10 psi., for example, the relay valve in the brake valve 1 responds substantially simultaneously to open said brake pipe to atmosphere via pipe 17. In the manner above described, therefore, sensing device 16, switch device 18, solenoid 20, and pilot valve 21 also react to operate switchover valve device 9 to its differential position, and the pressure registering on the high pressure side or the reference pressure of differential gauge 5, at the time said switch-over valve device operates to its differential position, would be that pressure prevailing in reference volume 10, which, in this case, would be substantially 70 psi. An indicator hand 24 of gauge 5 would move to the appropriate mark on the indicator scale so that the engineer could immediately and visually be apprised of the exact effective brake pipe reduction made.

Once having performed its function of effecting operation of switch-over valve device 9 to its differential position, switch device 18 may be either manually reset to its open position or it may be of the type automatically operative for resetting itself, the type of such switch device not being considered essential to an understanding of this invention.

Let it now be assumed that, at the time a brake application is initiated, brake pipe 23 has not had sufficient time to fully recharge, but is partially charged up to 65 psi., for example. Because the equalizing reservoir 4 and the reference volume 10 are of relatively small capacity, they are recharged to normal pressure (70 psi.) almost instantaneously when the engineer operates brake valve 1 to the release position. If an attempt is made to initiate a brake application by effecting a reduction of equalizing reservoir pressure when brake pipe pressure is at the above mentioned 65 psi., the relay valve does not respond to the equalizing reservoir pressure reduction, which starts from the 70 psi. full charge level, until the pressure in equalizing reservoir 4 has dropped to 65 psi., the pressure prevailing at that time in brake pipe 23.

Until such time that pressure in equalizing reservoir 4 drops to a slight fraction below 65 psi. to cause the relay valve in brake valve 1 to open brake pipe 23 to exhaust pipe 17 and consequent operation of switch-over valve device 9 to position D, indicator hand 24 remains at the zero mark indicating that brake pipe pressure reduction has not commenced yet. When pressure in equalizing reservoir 4 has dropped to slightly below 65 psi. to initiate reduction in brake pipe 23, as above explained, indicator 24 moves to a differential reading that tells the engineer the amount of effective reduction made, that is, the degree of differential between the pressure at which brake pipe pressure reduction commenced (the reference pressure in reference volume 10 at the time) and the degree at which it terminated. From the amount of reduction indicated on gauge 5, the engineer immediately knows the nature and effectiveness of the reduction effected and can promptly make any adjustments, if necessary.

Having now described the invention, what we claim as new and desire to secure by Letters Patent, is:

1. Brake pipe reduction indicating apparatus for use with automatic railway vehicle brake equipment and comprising: a. first means normally charged to a predetermined fluid pressure and operative responsively to a reduction of such fluid pressure therein for causing a brake application on the vehicle commensurate with the degree of reduction; b. second means normally charged with fluid pressure at a degree corresponding to said predetermined fluid pressure; c. operator's means selectively operable to a plurality of positions for initiating a reduction of fluid pressure in said second means to a selected reduced degree according to the position to which said operator's means is operated, d. said operator's means including relay valve means operable responsively to reduction of fluid pressure in said second means to a degree corresponding to the degree of fluid pressure prevailing in said first means at the time said reduction is initiated, for effecting reduction of pressure in said first means to said selected reduced degree; and wherein the improvement comprises: e. indicating means cooperatively responsive to reduction of fluid pressure in said first and second means for indicating the pressure differential between the initial pressure prevailing in said first means at the onset of said reduction and the final pressure prevailing therein at termination of such reduction.

2. Brake pipe reduction indicating apparatus, as set forth in claim 1, wherein said first means comprises a train brake pipe.

3. Brake pipe reduction indicating apparatus, as set forth in claim 2, wherein said second means comprises an equalizing reservoir.

4. Brake pipe reduction indicating apparatus, as set forth in claim 3, wherein said indicating means comprises: a. a differential pressure gauge having a high pressure side normally in communication with said equalizing reservoir and a low pressure side constantly in communication with said brake pipe; b. a fluid pressure reference volume normally in communication with said equalizing reservoir; and c. valve means having a normal position in which said communication of said equalizing reservoir with said reference volume and with said high pressure side of the gauge are in effect, d. said valve means being operable responsively to the onset of reduction of fluid pressure in the brake pipe, to a differential position in which communication of said equalizing reservoir is cut off from both the reference volume and the high pressure side of said gauge, and said reference volume is placed in communication with said high pressure side of said gauge.

5. Brake pipe reduction indicating apparatus, as set forth in claim 4, wherein said valve means further comprises: a. a switch-over valve device; b. biasing means for biasing said switch-over valve device toward said normal position; c. a fluid pressure operable pilot valve effective, when actuated, for operating said switch-over valve device to said differential position; d. electrical solenoid means including electrical circuitry effective, when energized, for actuating said pilot valve; and e. a fluid pressure operable electrical switch device interposed in said electrical circuitry and operable responsively to fluid pressure diverted from said brake pipe at the onset of said reduction of fluid pressure therein for effecting energization of said electrical solenoid means.

* * * * *